G. A. SMALL.
METHOD OF MAKING TUBING.
APPLICATION FILED JUNE 22, 1920.
1,387,199.
Patented Aug. 9, 1921.
Fig. 1.
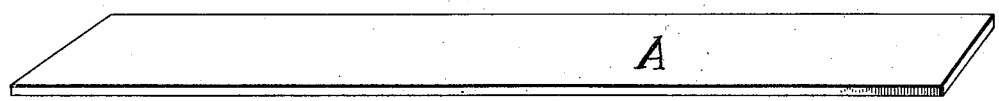
Fig. 2.     Fig. 3.
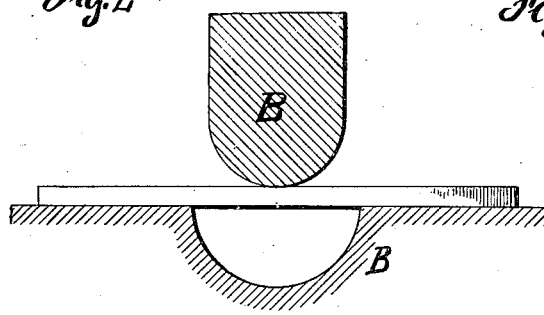 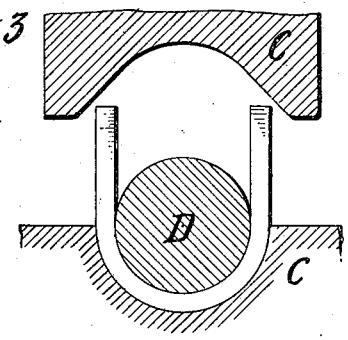
Fig. 4.    Fig. 5.    Fig. 7.
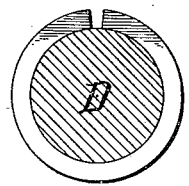 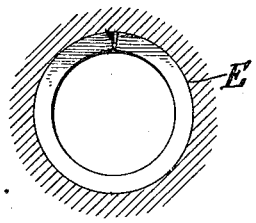 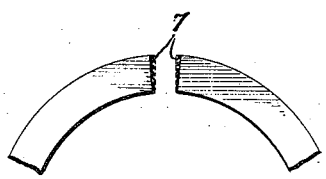
Fig. 6.    Fig. 8.    Fig. 9.
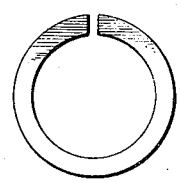 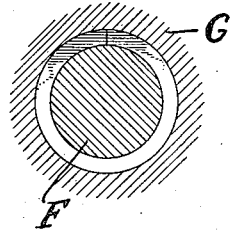 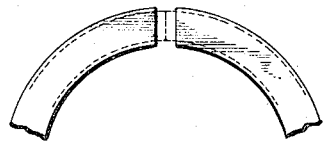
WITNESS.
Gustav Genzlinger.
INVENTOR.
George A. Small
BY
Synnestvedt & Lechner
ATTORNEYS.

UNITED STATES PATENT OFFICE.

GEORGE A. SMALL, OF PHILADELPHIA, PENNSYLVANIA, ASSIGNOR, BY DIRECT AND MESNE ASSIGNMENTS, TO PHILADELPHIA BRONZE BEARING & TUBE COMPANY, OF PHILADELPHIA, PENNSYLVANIA, A CORPORATION OF DELAWARE.

METHOD OF MAKING TUBING.

1,387,199.  Specification of Letters Patent.  Patented Aug. 9, 1921.

Application filed June 22, 1920. Serial No. 390,891.

*To all whom it may concern:*

Be it known that I, GEORGE A. SMALL, a citizen of the United States, residing at 4707 Windsor Ave., Philadelphia, in the county of Philadelphia and State of Pennsylvania, have invented certain new and useful Improvements in Methods of Making Tubing, of which the following is a specification.

This invention relates to a method of making tubing and is particularly useful in connection with bearing bushings of phosphor bronze or other suitable bearing metal.

One of the primary objects of my invention is to produce a substantially perfect tube from a blank in such manner that the edges will abut and form a substantially perfect tight butt joint.

I am aware that it has been contemplated in this art to form tubes from blanks or flat strips but in so far as I am aware it has hitherto been impossible to secure a tight butt joint in the absence of brazing, soldering, or the like, this being particularly true with reference to bearing bushings in which the metal, of course, is considerably harder than the ordinary copper or brass tubing and in which, also the thickness of the wall is greater.

Heretofore, commercially, it has been the custom either to draw bearing bushings from a pierced billet, the tube requiring finishing by suitable tools, or to cast the bushings, both processes being expensive and wasteful of material.

By the process hereinafter described, I propose to produce tubing or bushings, in practically any lengths, economically, expeditiously and with no wastage of material and without the necessity of machine finishing.

I accomplish the foregoing, together with such other objects as may hereinafter appear, by means of a method diagrammatically illustrated in the accompanying drawings, wherein—

Figure 1 is a perspective view of the blank from which the tubing is to be formed; Fig. 2 is a diagrammatic cross section illustrating one step of the forming operation; Fig. 3 is a similar section illustrating the second step of the forming operation; Fig. 4 is a sectional view illustrating the tube as formed; Fig. 5 is a cross section illustrating one of the steps by means of which I square up the edges of the tube, preparatory to closing the joint; Fig. 6 is an end elevation of the tube with the edges squared ready for closing up the joint; Fig. 7 is an enlarged fragmentary view illustrating the manner in which the edges are squared; Fig. 8 is a cross section showing a tube in process of having its joint closed; and Fig. 9 is an enlarged fragmentary view corresponding to Fig. 7, illustrating the manner in which the closing is effected.

In carrying out my invention, I take a strip or blank A which may be of any length, within practical limits, say for example, 10' to 12' more or less, the blank being preferably rectangular in cross section and having a plus thickness and a plus width, that is to say, it is thicker than the wall of the finished tube and has a width greater than the circumference of the finished tube. This blank is "formed" into a tube in any preferred manner as by means of the pair of forming dies B which give the blank a U-shape and the pair of dies C which complete the forming of the blank into a cylinder over a mandrel D, which is inserted after the first forming operation. The tube as formed over the mandrel D is shown in Fig. 4, from inspection of which it will be seen that the edges of the metal at the joint are spaced apart and extend approximately radially, *i. e.*, they diverge outwardly, this being so because the blank is rectangular.

As a first step essential to securing a tight butt joint, I have discovered that the edges must be made substantially parallel, and to accomplish this I remove the mandrel D and pass the tube through a die E or similar member adapted to perform work on the exterior of the tube. Where a die is used, I construct such die with a smaller diameter than that of the formed tube and I have discovered that as the tube is passed through the die, the metal at exterior, works around circumferentially and tends to bring the edges into parallelism. As many passes through dies of decreasing diameter, are made as is necessary to bring the edges approximately parallel, as shown, for example, in Fig. 6, which illustrates the tube in condition for the final closing operation. The manner in which the metal works around circumferentially during the operations when work is performed on the exterior of the tube, is illustrated diagrammatically at 7 in Fig. 7. After the forming operations and the operations for making the edges parallel, the spring of the metal tends to open the joint.

For closing the joint, I pass the tube, as shown in Fig. 6 over a plug F or other member of similar character, and through a die G. The diameter of the plug and the die are such as to produce work both on the exterior and the interior of the tube, so as to cause the metal to what I term "arch". This arching or setting causes the joint to remain closed and, while it is somewhat problematical as to what causes this arching, I attribute it to the performance of work both on the inside and outside of the tube which, I believe, has a tendency to cause the metal to flow both on the inside and the outside circumferentially and produces an elongation sufficient to place the particles of the metal under compression so that when the tube is free of the dies the spring or "arch" of the metal is sufficient to cause the joint to remain tight. Since, as it will be readily seen, the flowing of the metal under the action of the die and plug will crowd the edges together, the whole of the closing operation may be carried on by the die and plug, but more passes would be required than if the tube is first drawn only through the die, as shown in Fig. 5. The performance of the work by the plug and the die also elongates the tube, and performs another function which will be pointed out.

It is preferable that the blank should be in a soft or annealed condition for the forming operation, and I prefer to again soften or anneal the metal after the intermediate operations and prior to the finishing operation. The work performed on the tube during the finishing operation produces the degree of hardness required in bearing bushings, and in addition, the tube, as it leaves the finishing die and plug is ready for use, requiring no machining by tools, the die and plug serving to give the tube a high "finish". One pass over the plug F and through the die G is ordinarily sufficient to make the joint tight.

It will thus be seen that I can economically, expeditiously and without beveling the edges or other wastage of material, produce a tube from a blank with a tight joint. The tube is ready for immediate use without the performance of any work other than cutting to proper length.

I claim:

1. The art of making butt joint metallic tubes which consists in bending a metal blank to a tubular form with longitudinal edges in juxtaposition but not final relation and then drawing said form so as to flow the metal and set said edges in closer firm abutting relation.

2. The art of making butt joint metallic tubes which consists in bending a metal blank to a tubular form with longitudinal edges in juxtaposition but not in final relation and then flowing the metal of said form throughout so as to set said edges in closer firm abutting relation.

3. The art of making butt joint metallic tubes which consists in forming a blank to an approximately U-shaped cross-section, then in bending the limbs to form a tube with longitudinal edges in juxtaposition but not in final relation, and then in drawing the tube flowing the metal to set said edges in closer firm abutting relation.

4. The art of making butt joint metallic tubes which consists in bending a metal blank to a tubular form with longitudinal edges in juxtaposition but not in final relation and then in flowing the metal of said form so as to set said edges in closer firm abutting relation by a pressing operation producing a wall of substantially uniform thickness.

5. The art of making butt joint metallic tubes which consists in bending a metal blank to a tubular form with longitudinal edges in juxtaposition but not in final relation and then in flowing the metal of said form so as to set said edges in closer firm abutting relation by a pressing operation producing a wall of substantially uniform thickness and having its outer and inner surfaces substantially concentric.

6. As a new article of manufacture a butt joint tube having a wall of susbstantially uniform thickness with inner and outer surfaces substantially concentric, the metal of which is flowed throughout by a pressing operation to set the longitudinal edges in substantially fully abutting relating.

7. The art of making butt joint metallic tubes which consists in bending a metal blank to a tubular form with longitudinal edges in juxtaposition but not in final relation and then flowing the metal of said form so as to set said edges in closer firm abutting relation by drawing the form through a die and over a plug.

8. The art of making butt joint metallic tubes which consists in bending a metal blank to a tubular form with longitudinal edges in juxtaposition but not in final relation, in making said edges approximately parallel, and then in flowing the metal of said form throughout so as to set said edges in closer firm abutting relation.

9. The art of making butt joint metallic tubes which consists in bending a metal blank to a tubular form with longitudinal edges in juxtaposition but not in final relation, in making said edges approximately parallel by drawing the form through a die and then in flowing the metal of said form so as to set said edges in closer firm abutting relation by a pressing operation producing a wall of substantially uniform thickness.

In testimony whereof, I have hereunto signed my name.

GEORGE A. SMALL.